(12) United States Patent
Jimmerson

(10) Patent No.: US 8,938,735 B2
(45) Date of Patent: Jan. 20, 2015

(54) BOOTSTRAPPER AND SOFTWARE DOWNLOAD MANAGER

(75) Inventor: Shane Jimmerson, Arlington, TX (US)

(73) Assignee: Thomson Reuters Global Resources (CH)

( * ) Notice: Subject to any disclaimer, the term of this patent is extended or adjusted under 35 U.S.C. 154(b) by 1477 days.

(21) Appl. No.: 11/897,599

(22) Filed: Aug. 31, 2007

(65) Prior Publication Data

US 2009/0064135 A1    Mar. 5, 2009

(51) Int. Cl.
G06F 9/45     (2006.01)
G06F 9/445    (2006.01)
G06F 9/44     (2006.01)

(52) U.S. Cl.
CPC ............. *G06F 8/61* (2013.01); *G06F 9/4401* (2013.01)
USPC ........................... 717/178; 717/177; 717/174

(58) Field of Classification Search
None
See application file for complete search history.

(56) References Cited

U.S. PATENT DOCUMENTS

| | | | | |
|---|---|---|---|---|
| 5,721,824 | A * | 2/1998 | Taylor | 709/203 |
| 5,835,777 | A * | 11/1998 | Staelin | 717/175 |
| 6,282,711 | B1 * | 8/2001 | Halpern et al. | 717/175 |
| 6,381,742 | B2 * | 4/2002 | Forbes et al. | 717/176 |
| 6,385,766 | B1 | 5/2002 | Doran, Jr. et al. | |
| 6,438,749 | B1 * | 8/2002 | Chamberlain | 717/174 |
| 6,606,744 | B1 * | 8/2003 | Mikurak | 717/174 |
| 6,615,405 | B1 * | 9/2003 | Goldman et al. | 717/178 |
| 6,668,375 | B1 * | 12/2003 | Leovac | 717/178 |
| 6,687,901 | B1 * | 2/2004 | Imamatsu | 717/177 |
| 6,725,452 | B1 * | 4/2004 | Te'eni et al. | 717/168 |
| 6,775,423 | B2 | 8/2004 | Kulkarni et al. | |
| 6,895,463 | B2 | 5/2005 | Oga et al. | |
| 6,928,579 | B2 | 8/2005 | Aija et al. | |
| 6,978,439 | B2 | 12/2005 | Kelley et al. | |
| 6,990,660 | B2 * | 1/2006 | Moshir et al. | 717/171 |

(Continued)

FOREIGN PATENT DOCUMENTS

EP    2104274 A1    9/2009

OTHER PUBLICATIONS

Wikipedia, "Firmware", unknown date, Wikipedia; [retrieved on Apr. 19, 2012], Retrieved from Internet <URL:http://en.wikipedia.org/wiki/Firmware>; pp. 1.*

(Continued)

*Primary Examiner* — Xi D Chen
(74) *Attorney, Agent, or Firm* — Valenti, Hanley & Robinson, PLLC; Kevin T. Duncan

(57) ABSTRACT

The present invention provides a bootstrapper and download manager for handling the download and installation of one or more software products to a computer. The invention determines system requirements and whether any prerequisite software is required by a software product to be downloaded. Any necessary prerequisite software is installed on the computer and if more than one software product has a shared prerequisite, then the invention recognizes that and prevents downloading multiple ones of the shared prerequisites. Also, in the event of an interruption or error during download, the invention can resume downloading or installation based on the download successfully stored on the local machine without requiring the download all over again. This saves considerable time during the download and install process and enhances user productivity and experience. A download manager provides a user interface to efficiently select from multiple software products for download and negotiate issues such as multiple and different product licenses.

27 Claims, 11 Drawing Sheets

(56) References Cited

U.S. PATENT DOCUMENTS

| | | | |
|---|---|---|---|
| 7,055,150 B2* | 5/2006 | Terada et al. | 717/178 |
| 7,076,768 B2* | 7/2006 | Li et al. | 717/132 |
| 7,131,124 B2* | 10/2006 | Hanyu | 717/177 |
| 7,191,327 B2 | 3/2007 | Viljoen et al. | |
| 7,222,341 B2* | 5/2007 | Forbes et al. | 717/170 |
| 7,266,815 B2* | 9/2007 | Butt et al. | 717/168 |
| 7,349,769 B2* | 3/2008 | Hayashi et al. | 717/177 |
| 7,406,483 B2* | 7/2008 | Leymann et al. | 717/174 |
| 7,409,435 B1* | 8/2008 | Bayerl et al. | 717/124 |
| 7,478,381 B2* | 1/2009 | Roberts et al. | 717/174 |
| 7,478,385 B2* | 1/2009 | Sierer et al. | 717/174 |
| 7,533,380 B2* | 5/2009 | Neuer et al. | 717/174 |
| 7,546,594 B2* | 6/2009 | McGuire et al. | 717/177 |
| 7,574,706 B2* | 8/2009 | Meulemans et al. | 717/177 |
| 7,774,775 B2* | 8/2010 | Robsahm | 717/174 |
| 7,797,697 B2* | 9/2010 | Woollen et al. | 717/170 |
| 7,823,146 B2* | 10/2010 | Surace | 717/168 |
| 7,861,241 B2* | 12/2010 | Kumagai et al. | 717/174 |
| 7,899,959 B2* | 3/2011 | Anwer | 717/174 |
| 7,913,248 B1* | 3/2011 | Lynch et al. | 717/174 |
| 7,971,047 B1* | 6/2011 | Vlaovic et al. | 717/168 |
| 8,196,133 B2* | 6/2012 | Kakumani et al. | 717/178 |
| 8,312,449 B2* | 11/2012 | Dawson et al. | 717/178 |
| 2002/0188941 A1* | 12/2002 | Cicciarelli et al. | 717/174 |
| 2004/0003034 A1* | 1/2004 | Sun et al. | 709/203 |
| 2004/0045000 A1* | 3/2004 | Hara | 717/178 |
| 2004/0243995 A1* | 12/2004 | Sheehy | 717/174 |
| 2005/0132359 A1* | 6/2005 | McGuire et al. | 717/175 |
| 2005/0229174 A1* | 10/2005 | Westendorf et al. | 717/175 |
| 2006/0010435 A1* | 1/2006 | Jhanwar et al. | 717/168 |
| 2006/0048145 A1* | 3/2006 | Celli et al. | 717/177 |
| 2006/0248309 A1* | 11/2006 | D'Alterio et al. | 711/206 |
| 2006/0271924 A1* | 11/2006 | Calcaterra et al. | 717/168 |
| 2007/0044096 A1* | 2/2007 | Choe | 717/178 |
| 2007/0094658 A1* | 4/2007 | DiCarlo et al. | 717/178 |
| 2008/0209414 A1* | 8/2008 | Stein | 717/173 |
| 2011/0126192 A1* | 5/2011 | Frost et al. | 717/178 |

OTHER PUBLICATIONS

Chuang, et al., "Dynamic Service Reconfiguration for Wireless Web Access"; 2003, ACM; [retrieved on Sep. 2, 2014]; Retrieved from Internet <URL:http://dl.acm.org/citation.cfm?id=775152>;pp. 58-67.*

Singh, Gambhir, "Distributed Concurrent Downloading of Common Content in a BitTorrent Peer Group"; 2010 IEEE; [retrieved on Sep. 2, 2014]; Retrieved from Internet <URL:http://ieeexplore.ieee.org/stamp/stamp.jsp?tp=&arnumber=5560531>;pp. 1-5.*

Intellectual Property Office Examination Report, Nov. 21, 2011, 4 pages.

* cited by examiner

BOOTSTRAPPER AND SOFTWARE DOWNLOAD MANAGER

FIELD OF THE INVENTION

The field of the invention relates generally to computer science and the loading or downloading of software, including operating systems, applications and other units of code, into the memory of a computer for execution on the computer. More particularly, the present invention relates to a download manager and bootstrapper to select for download one or more software applications or units, to confirm software application prerequisites, and to improve and make more efficient the installation of software products.

BACKGROUND OF THE INVENTION

Computers, processors and software executing on such devices are increasingly incorporated into more and more components of everyday life and (especially with high level code) processors and supporting components and operating systems are increasingly versatile. Moreover, the speed with which revisions and new versions of software code are published or otherwise made available has resulted in a growing occurrence of users downloading software, such as applications over the Internet or other network, to update functionality or install "fixes" that address errors in operation. As part of this process, the downloaded software is installed on the target machine. Complications arise when installation errors occur, e.g., communication links are severed or other mishaps occur prior to completion of installation. This is increasingly true as networks incorporate or move altogether to wireless communication.

Enterprise-wide software distribution or deployment may involve a large number of downloads and installs, including updates and service packs, and presents particular challenges and involves considerable administrative resources. Remote installation, e.g., MSI and EXE software, is increasingly popular as a way to more productively manage system-wide needs across a large network, such as a Windows-based network. Client/Server architecture for instance facilitates installation and allows access across a network via a browser. Generally, the term bootstrapper refers to a software application that is invoked to manage the installation of another software application and its required/prerequisite software components. Basic bootstrappers typically perform a few checks and then launch a single software application installer, e.g., MSI (Microsoft Installer—file extension) installations. Advanced bootstrappers, sometimes called chainers, have greater capabilities and do more than merely run a single software application installer. An example of a complex bootstrapper is the Microsoft ClickOnce bootstrapper that is included with Microsoft Virtual Studio 2005 and used in deploying Microsoft .NET and other applications. MSBuild is a Microsoft build engine that provides an XML-based project file format used to create and edit extensible build solutions. MSBuild may be used to generate a product specific bootstrapper manifests, e.g., ClickOnce bootstrapper. MSBuild generates a product specific manifest that is embedded into the bootstrapper binary executable. The manifest is then read by the bootstrapper when it is running.

A need exists for an improved installation technique that will facilitate multiple product installations while minimizing downtime, rebooting, and other detrimental side-effects experienced by the user. In addition, when the multiple products to be downloaded have different installation experiences, a need exists for a technique to manage, coordinate and simplify—to the user—the overall download and install process and to provide a more reliable, resilient installation experience. With the growing number of software applications available to users, there is a growing need to streamline the process of downloading desired software. Compounding this problem is code that is often written to run in conjunction with other underlying or prerequisite code. Due to this, the process of downloading software may require multiple downloads.

Advanced applications often require multiple installation steps, prerequisites, and application installation package or packages. Examples of such an application, solution, or suite are eTools, ePractice Aids, and SMART ePractice Aids provided by Thomson Tax & Accounting. In the process of downloading a solution or multiple set of solutions the managing component analyzes target system information to determine required prerequisites. Often, users must halt running instances of existing applications to facilitate download and installation processes. Optionally, users may be informed of the need for installation of prerequisites. In addition, the installation process may involve dynamically organizing the installation sequence.

One of the problems with existing techniques is that the installation experience across multiple products is often not consistent to the user and is further complicated when involving and viewing multiple license agreements. Different user interfaces result in different user experiences and a complicated download/install process. As an example, one of the issues with the Microsoft ClickOnce bootstrapper is that if the installation fails for any reason, any prerequisites that had not been installed are automatically downloaded again. This can be very frustrating to a user and especially when the user has to experience a second, third, etc. download of 50 MBytes of software, for example, again just to try the installation again. There is little control over the ClickOnce bootstrapper and other installation bootstrappers, e.g. suppressing reboots; returning status codes indicating success, failure, reboot, etc.; and keeping the bootstrapper running until all prerequisites and application are installed.

SUMMARY OF THE INVENTION

The present invention provides an improved download management function and a bootstrapper capable of efficiently accomplishing software downloads and installation. The invention in various embodiments provides one or more of the following benefits: streamlined selection of multiple software product downloads, identifying software prerequisites, confirming system requirements and existing installed software components, identifying shared prerequisites across multiple software product downloads, and avoiding unnecessary redundant downloads of software components during installation.

The installation process often involves managing multiple license agreements and providing control over progress indication, control of reboot, and control of success/fail attempts. The present invention handles download and installation, which may be for example via CD-ROM, World Wide Web, Internet or other network-based installation. The bootstrapper manages what gets installed and in what order. The bootstrapper analyzes the target system for prerequisites requirements and includes APIs (Application Programming Interfaces) for access from outside applications. Web-based product installation is compatible with known platforms such as MSBuild, which is used not only to generate product specific bootstrapper manifests, but also to automate this process and other processes such as compiling source code and building the installations. Solutions, such as Thomson Tax & Accounting's eTools, make use of these framework tools to automate build from source code.

To address the problem of automatic re-download after interrupted or failed installation, the present invention first checks to see if the downloaded files are on the machine before re-downloading them. As used herein, interrupted shall refer to any interruption, including failed operations, canceled installations, and failed download due to a failed connection. In this manner, the invention saves time by avoiding unnecessary re-downloads and provides a more enjoyable and productive user experience. Normally, necessary files are downloaded prior to installation and are downloaded to a shared location. If a download fails then the download restarts with the last file that failed. If an installation fails, but download was successfully completed, then none of the files have to be downloaded again prior to running the installation again. The bootstrapper of the present invention looks to the location it has assigned for the download to see if the necessary files are present and ready for installation.

One benefit of the present invention is that it provides a more consistent user experience. Another benefit is that it provides a more reliable and resilient installation experience. Another benefit is that it provides for multiple product installations across various and different platforms, frameworks and API and toolsets, e.g., Microsoft .NET 2.0/Visual Studio 2005 ClickOnce bootstrapper. The invention provides a consistent user interface across multi-product download/install.

A further benefit of the present invention is that it provides recoverable and resumable downloads in the event of interrupted download or installation. This may greatly reduce the install time associated with loading software such as via CD-ROM or over a network. As used herein unless otherwise indicated, network is intended to cover a communication connection of devices, such as computers, PDAs, mobile phones and other processing devices, and shall include, for example, Local Area Network (LAN), Wide Area Network (WAN), World Wide Web, or the Internet. Networks may be wired, wireless or a combination of wired and wireless networks. An added benefit, is that the invention addresses the piece-meal download/installation process that presently detracts from the user experience. The present invention provides coordinated control over the download and install process from beginning to end. The invention may be used to support administrative installations to assist in software deployment.

An additional benefit of the present invention is an administrative install capability in which product and prerequisite installations are configured by an administrator for deployment of the product and prerequisite throughout the organization. The administrative installation assists a network administrator by pre-configuring an installation prior to deployment so the installation settings are specified for each individual processing device, such as a personal computer or mobile telecommunications device.

Although many benefits and features are described as advantages offered by the present invention, only a subset of such benefits and features may be used in any given implementation. It should be understood that it is not necessary to utilize all such benefits and features to practice the invention.

In one embodiment, the present invention provides a method of installing software comprising: commencing installing software on a processing device; upon an interruption in the installing step, determining whether the software is stored in a memory of the processing device; and if the software is stored in the memory of the processing device, recommencing installing the software without causing a further download of the software. The method may further comprise presenting for selection a plurality of software products for downloading and installing on the processing device, wherein the software comprises selections from the plurality of software products. The method may further comprise: determining a first set of prerequisite software associated with a first software product and a second set of prerequisite software associated with a second software product; and determining a set of shared prerequisite software comprising prerequisite software common to the first and second sets of prerequisite software. The method may further comprise: downloading the shared prerequisite software, whereby duplicate downloading of shared prerequisite software is avoided. The method may further comprise: prior to commencing installation, downloading the software; determining that not all of the software was successfully downloaded; and prior to recommencing installation, re-downloading software that was not successfully downloaded while avoiding re-downloading at least some of the software that was successfully downloaded.

In another embodiment, the invention provides a method for downloading software: presenting a plurality of software products available for download; downloading and installing at least two software products selected from the plurality of software products; determining a set of prerequisite software products associated with the at least two software products for downloading; determining a set of shared prerequisite software products common to at least some of the at least two software products; and downloading the set of shared prerequisite software products, whereby duplicate downloading of shared prerequisite software products is avoided.

The system may further comprise the set of shared prerequisite software products comprising at least one prerequisite software product. The method may further comprise downloading and installing the at least two software products. The method may further comprise: after an interruption in installing the at least two software products, determining that a portion of the at least two software products is stored in memory and recommencing the installation step without causing a further download of the stored portion of the at least two software products. The method may further comprise downloading a missing portion of the at least two software products, whereby the stored portion and the missing portion combine to provide a complete download of the at least two software products sufficient for installation.

In yet another embodiment, the invention provides a client device connected to a software source, the client device comprising: a processor for executing software; a memory connected to the processor and adapted to receive and store software for execution by the processor; and a bootstrapper adapted to manage the download and installation of software from the software source, the bootstrapper comprising: a user interface enabling selection of software to be received by and installed on the client device; executable code adapted to determine whether selected software is stored in the memory, whereby unnecessary downloading of software during installation is avoided.

The device may further comprise the software source is a central server and the client device receives software from the central server via a communication network. The software source may comprise one of a CD ROM, a USB flash drive, and a memory stick. The memory may comprise: a temporary memory for receiving software downloads; and a persistent memory for storing installed software. The bootstrapper executable code may determine that a portion of selected software is stored in the temporary memory and the bootstrapper may cause a downloading of unstored portions of the selected software to complete the download for installation of the selected software. The client device may comprise one of a computer, a PDA, a mobile phone. The client device may be further adapted to configure folders at a specified location at which the software is installed on the client device. The software may be stored in a persistent memory of the client device.

In yet another embodiment, the invention provides a method for downloading software, the method comprising: determining whether at least one prerequisite software associated with a software product to be downloaded is installed on a processing device; if the prerequisite software is not installed on the processing device, then determining whether the prerequisite software is stored on the processing device; if the prerequisite software is not stored on the processing device, then downloading and installing the prerequisite software on the processing device; and if the prerequisite software is stored on the processing device, then installing the stored prerequisite software.

In yet another embodiment, the invention provides a bootstrapper for managing the download of software products, the bootstrapper comprises: a user interface enabling selection of a software product to be installed on a processing device associated with the bootstrapper; and executable code adapted to determine whether the software product is stored in a memory of the processing device but is not installed on the processing device.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

DETAILED DESCRIPTION OF THE INVENTION

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
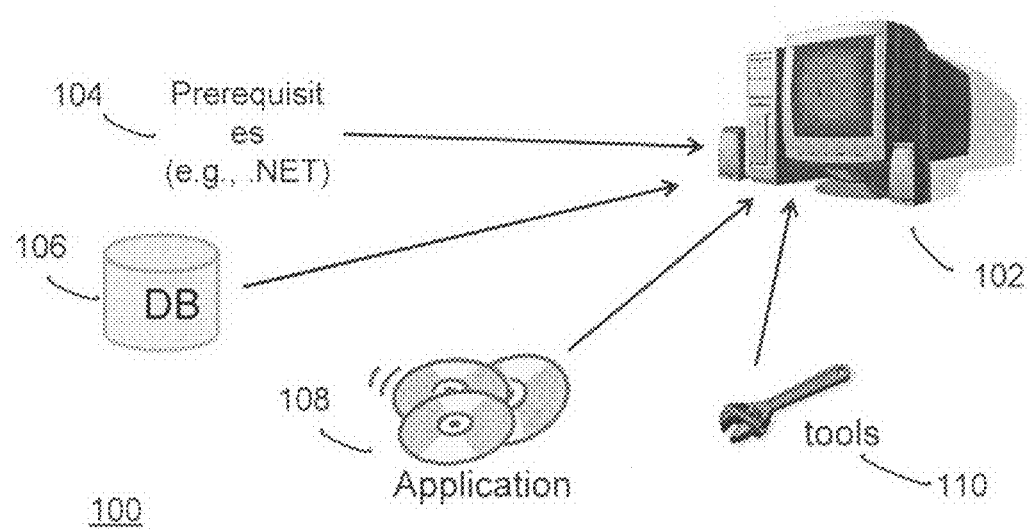
FIG. 1 is a schematic diagram illustrating a first exemplary system for selecting, downloading and installing software products according to the present invention.

With reference to FIG. 1, an exemplary set of components typical to a software download and installation process is illustrated generally at 100 as including a target machine 102, one or more prerequisites 104, database 106, applications 108 and tools 110. The present invention provides a bootstrapper and download manager including a user interface to handle software download and installation onto the target machine 102. The download and installation process often involves managing multiple license agreements and providing control over progress indication, control of reboot, control of success/fail attempts, and more AIP (Administrative Installation Point) options. AIP is a result of performing an administrative installation. A network administrator then deploys the application and prerequisites for this AIP. The installation process is often via CD-ROM, Web, Internet or other network-based installations. The bootstrapper manages what gets installed and in what order and may use such known tools as XML manifest. The bootstrapper analyzes the target system for prerequisites requirements and includes APIs (Application Programming Interfaces) for access from outside applications. The bootstrapper makes use of the download manager for Web-based product installation and is compatible with known platforms such as MSBuild as part of the .NET Framework that allows automation of compiling source code. Solutions such as eTools make use of these framework tools to automate build from source code. MSBuild may be used to generate the manifest that contains data prerequisites and built into bootstrapper executable.

The download manager manages downloads of application components, files, prerequisites, etc. For instance, the download manager uses Microsoft BITS (Background Intelligent Transfer Service) for transferring files from server to target machine and provides download progress information. In one manner the download manager asynchronously transfers files in the foreground or background, preserves the responsiveness of other network applications, and automatically resumes file transfers after network disconnects and computer restarts.

To avoid the problem of automatic re-download after failed installation, the bootstrapper first checks to see if the downloaded files are on the machine before re-downloading them. This avoids unnecessary re-downloads and provides a more enjoyable and productive user experience. Files are downloaded to a shared location. If a download fails the download will restart with the last file that failed. If an installation fails or is otherwise interrupted, then none of the files have to be downloaded again prior to running the installation again. In this manner the invention provides recoverable and resumable downloads in the event of interrupted download or installation. This has the effect of greatly reducing the install time associated with loading software such as via CD-ROM or over a network. The bootstrapper and download manager may be configured to manage multiple product installations across various and different platforms, frameworks and API and toolsets, e.g., Microsoft .NET 2.0/Visual Studio 2005 ClickOnce bootstrapper. This avoids the piece-meal download/installation process that presently detracts from the user experience. The invention provides coordinated control over the download and install process from beginning to end and may be used to support administrative installations to assist in software deployment.

Figure 2:
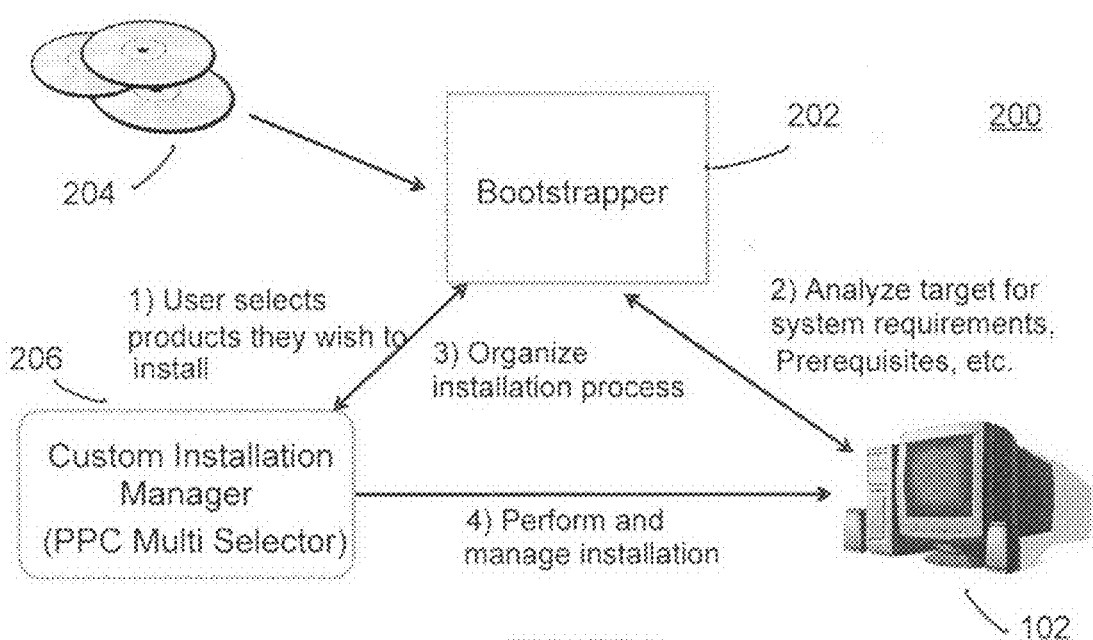
FIG. 2 is a schematic diagram illustrating a first exemplary embodiment of the bootstrapper and download manager of the present invention.

Examples of installations handled by the bootstrapper and download manager of the present invention include over the Internet or other computer network. FIG. 2 illustrates one exemplary software and download installation, referenced generally by 200. A target machine 102 is to receive the software download. At step 1) the user selects one or more software products they wish to install onto machine 102, or for that matter it may be some other target machine or group of machines. In one embodiment, the bootstrapper only installs to the machine on which the installation manager is running. However, during administrative installation, the installation files may be copied and configured by the administrator to the AIP directory specified by the administrator. With the AIP directory on the network, then the files are copied to the network. An administrative installation does not necessarily install the application and prerequisites to the machine(s) as it may just configure the installations to ease deployment throughout an organization. The bootstrapper 202 is used to install products that use the bootstrapper 202. The Custom Installation Manager 206 calls the bootstrapper 202 to install the application and the prerequisites. Product installations that do not use the bootstrapper 202 are managed by the Custom Installation Manager 206. At step 2) bootstrapper 202 then analyzes the target machine 102 to determine system requirements, prerequisites and other desired information. At step 3) the bootstrapper 202 dynamically organizes the installation process. At step 4) the bootstrapper 206 performs and manages the installation of the software onto the machine 102.

Figure 3:
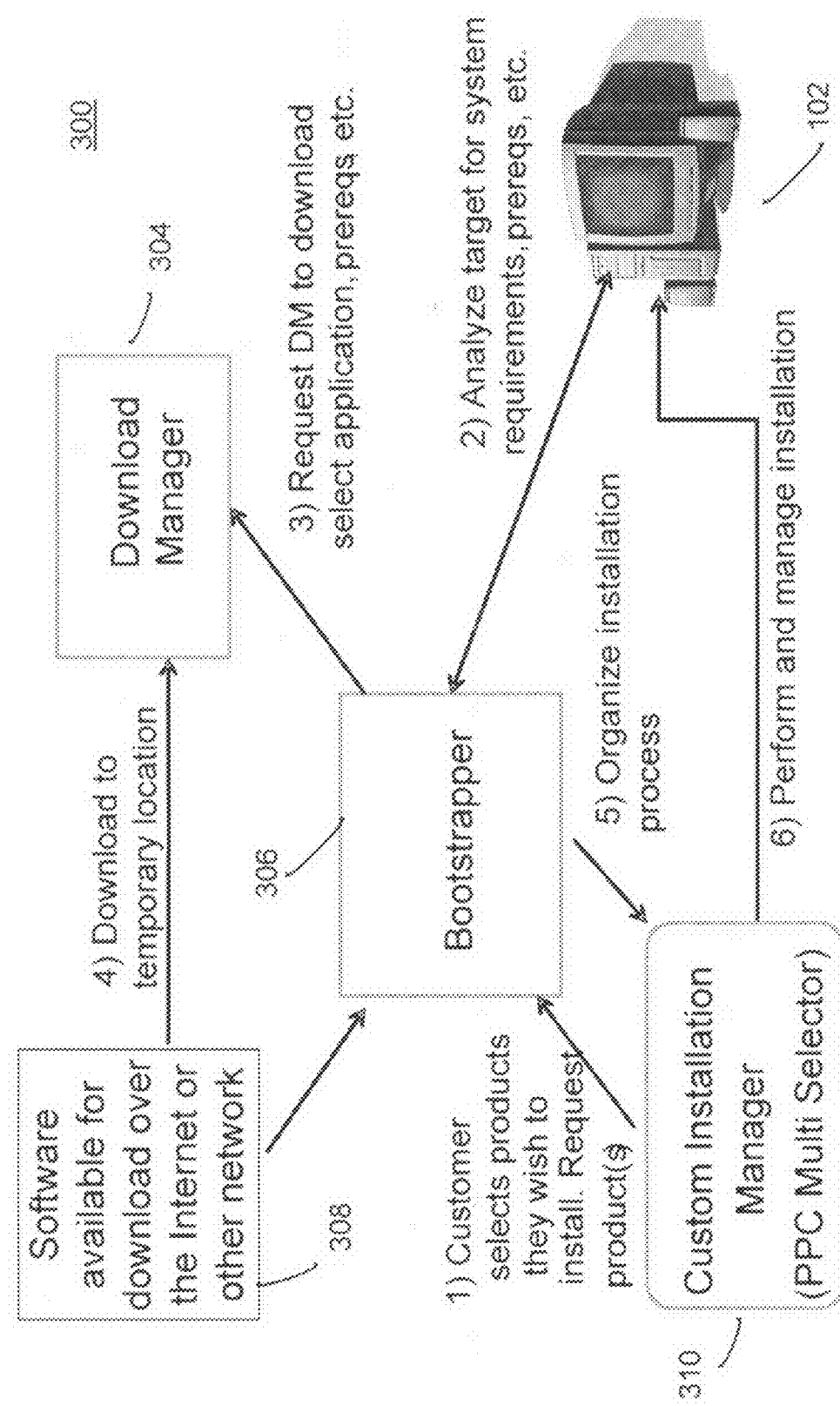
FIG. 3 is a schematic diagram illustrating a second exemplary embodiment of the bootstrapper and download manager of the present invention.

Now with reference to FIG. 3, one exemplary software and download installation, referenced generally by 300, from the Internet is illustrated. A target machine 102 is to receive the software download. At step 1) the user selects one or more software products they wish to install onto machine 102, or for that matter it may be some other target machine or group of machines. The bootstrapper 306 is used to install products that use the bootstrapper 306. The Custom Installation Manager 310 calls the bootstrapper 306 to install the application and the prerequisites. Product installations that do not use the bootstrapper 306 are managed by the Custom Installation Manager 310. At step 2) bootstrapper 306 then analyzes the target machine 102 to determine system requirements, prerequisites and other desired information. At step 3) the bootstrapper 306 requests the download manager 304 to download one or more selected applications or other software products, including prerequisite products, such as selected from step 1). At step 4) the requested and/or prerequisite software is downloaded to a temporary location on the machine 102 or storage available to the machine 102. Once downloaded, at step 5) the bootstrapper 306 is informed that the download is complete and dynamically organizes the installation process. At step 6) the bootstrapper 306 performs and manages the installation of the software onto the machine 102.

As described, the process may employ a custom installation manager which may invoke the bootstrapper. The customer may select from a set of available software products based on existing licenses or arrangements made at the time of the selection and prior to download. In one embodiment, the custom installation manager presents the user with a set of software products available for download and the customer/user selects the software products to be downloaded, and perhaps purchased. The download manager shows the progress of the download of the selected products, which may also require a download because the product installation files may not already have been downloaded and the product not already installed. Particulars may depend upon a contract the user, or the user's company or employer, has with a supplier of software products. Known resources available to facilitate these processes include InstallShield—see http://www.macrovision.com/products; Wise—http://www.wisesolutions.com; and Microsoft MSI—http://msdn2.microsoft.com/en-us/library/2kt85ked(VS.80).aspx.

In addition, a multi-product installer that is versatile and useful in a variety of scenarios, including CD-ROM, Internet, and other network-based embodiments, may be used and may call upon and use the download manager and bootstrapper. To facilitate description of the inventive techniques and not by way of limitation, the following description of the invention is in part in the context of Microsoft .NET 2.0/Visual Studio 2005 and associated known APIs, toolsets, e.g., ClickOnce bootstrapper. The invention is also described in the context of Thomson eTools, E-Practice Aids and SMART e-Practice Aids (SPRE) products. It should be understood that the invention is not limited to such environments and has broad applicability. The invention may be used to manage download and install of a variety of different product and is versatile to handle vastly different installation experiences. For example, some products require a single MSI installer while other products require the installation of prerequisites such as MDAC (Microsoft Data Access Components), Windows Installer, .NET and SQL Express. The bootstrapper may not be used in the event of single MSI installations, but it could. The multi-product selector may be used to manage the installation of single MSI installations without the use of the bootstrapper. The single MSI installation may be downloaded using the download manager.

Figure 4:
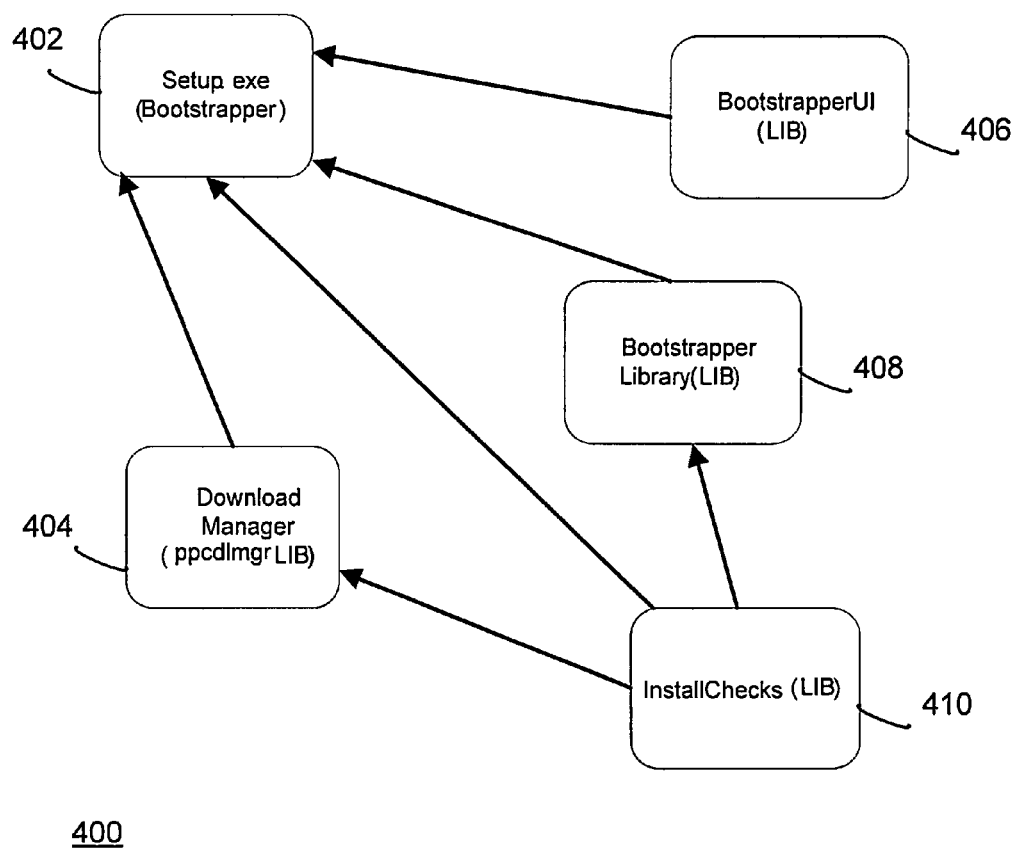
FIG. 4 is a diagram illustrating the bootstrapper comprised of static library (LIB) components.
Figure 5:
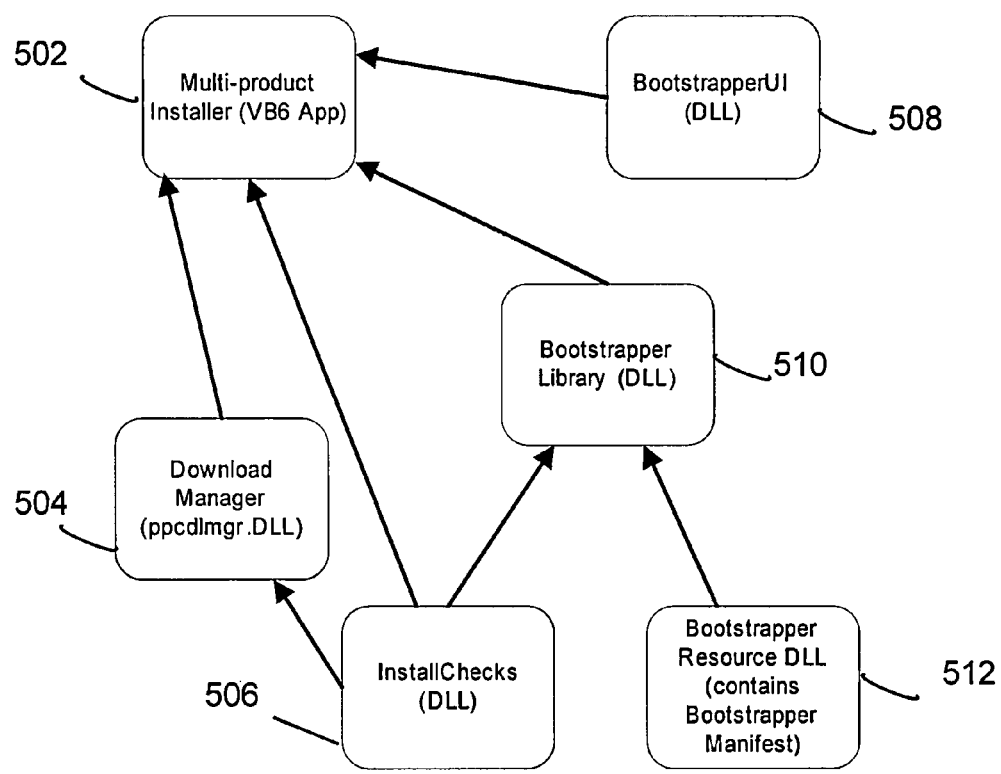
FIG. 5 is a diagram illustrating the bootstrapper comprised of dynamic link library (DLL) components.

FIGS. 4 and 5 provide exemplary overviews of bootstrapper application components designed to be either dynamically linked (DLL—Dynamic Link Library) or statically linked (LIB—Library). In one exemplary implementation, components were developed using VC++ 8.0 (VS2005)/MFC 8.0 (Microsoft Foundation Classes). With reference to FIG. 4, an exemplary overview of the components comprising one exemplary bootstrapper application 400 is shown. The components include: BootstrapperLibrary (LIB) 408, Download Manager (LIB) 404, BootstrapperUI (LIB) 406, and InstallChecks (LIB) 410. In this example, the Bootstrapper Application 400 statically links the other components and MFC to create a stand-alone bootstrapper EXE 402 and can run without installing any additional dependencies on Win2000 and greater systems.

With reference to FIG. 5, an exemplary overview of the components comprising an exemplary multi-product installer and bootstrapper application 500 is shown. The components include: BootstrapperLibrary (DLL) 510, Download Manager (DLL) 504, BootstrapperUI (DLL) 508, InstallChecks (DLL) 506, and Bootstrapper Resource DLL 512. The Bootstrapper Resource DLL contains the Bootstrapper manifest, such as an XML manifest. The components were designed to be dynamically linked (DLL—Dynamic Link Library). In this example, existing VB6 application 502 may be used to facilitate installation of multiple products from the Internet and all components are DLLs.

In one embodiment, the bootstrapper may be adapted from the Microsoft ClickOnce bootstrapper that is included with Visual Studio 2005. In this manner, the bootstrapper may be configured to consume existing and future bootstrapper packages that conform to existing package schema without modification. See http://msdn2.microsoft.com/en-us/library/ms229223(vs.80).aspx for existing ClickOnce Product and Package schema. In this manner, the design can extend the known schema with optional elements to support additional features that the existing schema does not support. In addition to the schema changes the bootstrapper embodiment may be configured to support existing elements in slightly different manners and with additional functionality.

In this exemplary bootstrapper embodiment, Table 1 presents schema additions to the existing ClickOnce Product and Package:

TABLE 1

PrerequisiteID Application attribute - Contains reference to prerequisite package that serves as the primary application installer. This package is installed last.
WarningIf InstallCondition element - Child of the InstallConditions element and used to support warning messages to the user - warnings not displayed when the installation is running silent or basic UI levels (see Installation UI Modes below).
AdminInstallAvailable attribute - optional attribute added to the Command element to indicate whether an installation supports administrative installations. If this attribute does not exist or the value is false then the package file specified in the command is copied to the AIP. If this attribute exists and it is set to true then the installation file will be run in administrative mode. If the package file is a non-MSI installer or an MSI installer called from an intermediate bootstrapper include the Admin Arguments attribute. MSI installations do not require AdminArguments attribute unless need to pass additional properties during the administrative installation. In this case the MSI properties should be specified in the AdminArguments attribute.
NOTE: The Arguments attribute is ignored when running in administrative mode.
Admin Arguments attribute - optional attribute added to the Command element to support administrative installations. Attribute does not exist or the value is empty then the package file specified in the command is copied to the AIP. If installer is MSI based use the MSI file for installation. An EXE to run MSI installation will not run from the AIP.
Installation UI Modes - Based off Windows Installer UI Levels. UILevels ignored for MSI installations. For non-MSI installations or MSI installers called from an intermediate bootstrapper specify additional command line arguments using the attributes below. If a particular level is not specified then the Arguments or AdminArguments attribute used as is. If an installation does not support each of these modes each attribute should be specified using next closet level available, e.g., installation may not support Basic and reduced UI modes so specify the same arguments for both attributes. The arguments for a specified level will be added after the arguments specified in the Arguments or AdminArguments attribute. The default is to run in Basic UI mode or if that is not specified it will run the command in the mode specified in the Arguments or AdminArguments attribute are used as is. Typically when specifying these additional attributes, the Arguments and AdminArguments attribute will not contain any options specifying a UI mode which means it will run in full UI mode. The following attributes will be ignored when running the bootstrapper in full UI mode:
   SilentUIArgument attribute - optional attribute added to the PackageFile element to support silent installations. Contains the command line switch that will trigger the installation file to run in silent mode.
   BasicUIArgument attribute - optional attribute added to the PackageFile element to support Basic UI (progress only) installations. Contains the command line switch that triggers the installation file to run in basic UI mode.
   ReducedUIArgument attribute - optional attribute added to the PackageFile element to support Reduced UI installations. Contains the command line switch that will trigger the installation file to run in Reduced UI mode.
Shareable attribute - Added to the PackageFile element to support sharing a prerequisite file. If set to TRUE the files will be downloaded to a shared directory if the bootstrapper receives a shared directory base path. If not set, does not exist, or is set to FALSE, the prerequisite file will not be downloaded to a shared directory and downloaded to a path relative to the bootstrapper application.

In this exemplary bootstrapper embodiment, one change to the handling of schema items in the existing ClickOnce Product and Package is "EstimatedInstallSeconds" attribute. This is an attribute of the Command element and is used as an estimated length in seconds that the default progress should display. If the installation took longer than the estimate then the progress bar would start over and a message displayed below the progress bar indicating that the installation is taking longer than expected. Many installations, especially MSI installations, show a progress bar. The bootstrapper embodiment thus far described changes how this attribute is handled. If the value of this attribute is 0 (zero) the default progress bar is not displayed. In this case, the appropriate command line arguments should be used in the Arguments attribute to display the installations progress bar.

In this exemplary bootstrapper embodiment, additional bootstrapper functionality to the existing ClickOnce Product and Package schema may include the following: 1) add support for administrative installations; 2) add a single license agreement dialog that allows the user to view and accept the license agreements for all the prerequisites in one dialog; 3) support for UI modes silent, basic, reduced and full; and 4) add built-in properties, e.g., VersionWord and VersionExcel, that store the current version of an (OS) operating system, a software application, e.g., Word and Excel installed on the PC.

In this exemplary bootstrapper embodiment, existing features in ClickOnce Bootstrapper include "Verifying Files." Once the required files have been downloaded, the Windows Trust Provider Service function WinVerifyTrust is called to ensure that the file is safe to install. For example, if a downloaded file does not have a digital signature then the file may be verified using a hash value that is computed when the bootstrapper manifest is generated. WinVerifyTrust searches the file for a signature block (also known as a digital signature). The signature block contains information about the author of the file, a public key, and an encrypted digest of the file's contents. If it finds a signature, WinVerifyTrust validates the certificate. The validation process uses the concept of a trust hierarchy; each certificate is inspected for a parent certificate until it reaches the root certificate. WinVerifyTrust looks for the root certificate in the system's list of trusted root certificates. If WinVerifyTrust finds the root certificate, it inspects each certificate in turn to make sure the certificate is trusted by its parent until the original file certificate is tested. If the certificate is invalid for any reason, a message displays indicating a concern about the contents of the file. However, the user always has the option to install the file anyway. If the certificate is valid, the trust verification service decrypts the digest with the public key and regenerates the digest on the downloaded file. If the two digests don't match, the file has been tampered with. Again, a warning message displays for the user. The service also displays a warning if it doesn't find any certificate at all. Even if the certificate is valid, the user or system administrator may elect to display messages before installing files on a system. The Windows Trust Verification Service actually defines two types of certificates: one for commercial developers and one for individual developers. The main differences are in the types of documentation developers must provide to qualify for the certificate and the types of security provided for the developers' private keys. Users can display warning messages for files from all commercial developers, all individual developers, commercial developers not previously encountered, individual developers not previously encountered, and so on. When the warning message displays, the certificate holder may be added to the trust hierarchy so future files from the same source install without warnings. The warning message may display the name of the software, the identity of the publisher, and the issuing certificate authority so the user can make an informed decision about installing files.

In this exemplary bootstrapper embodiment, bootstrapper components include the following. InstallChecksHelper, a component that contains common code such as getting the version of the OS, Word, Excel, performing install checks, and version comparisons. This component may be a LIB for statically linking with the bootstrapper application and a DLL for dynamically calling from the multi-product installer or other applications. Bootstrapper UI is a component that contains the multi-item license agreement dialog, the dialog to view a single license agreement and default progress bars. This component may be a LIB for statically linking with the bootstrapper application and a DLL for dynamically calling from the multi-product installer or other applications. Bootstrapper Library is a component that contains common bootstrapper functionality. This component may be a LIB for statically linking with the bootstrapper application and a DLL for dynamically calling from the multi-product installer or other applications. Bootstrapper Application is an EXE component that may statically link the Bootstrapper Library, Bootstrapper UI, InstallChecksHelper and Download Manager. This component may be used for stand-alone application installations, e.g., installing from CD-ROM.

Download Manager maybe a LIB for statically linking with the bootstrapper application and a DLL for dynamically calling from the multi-product installer or other applications. The Download Manager uses the Microsoft Background Intelligent Transfer Service (BITS) for the physical download of the files. It also provides two UI for displaying the progress of the downloads. The first is a basic UI that shows a single overall progress bar for all the files being downloaded. The second UI is a detailed UI that shows the download progress for each file and an overall progress bar for all the downloads. There is also a silent mode that does not display a UI at all.

Figure 6:
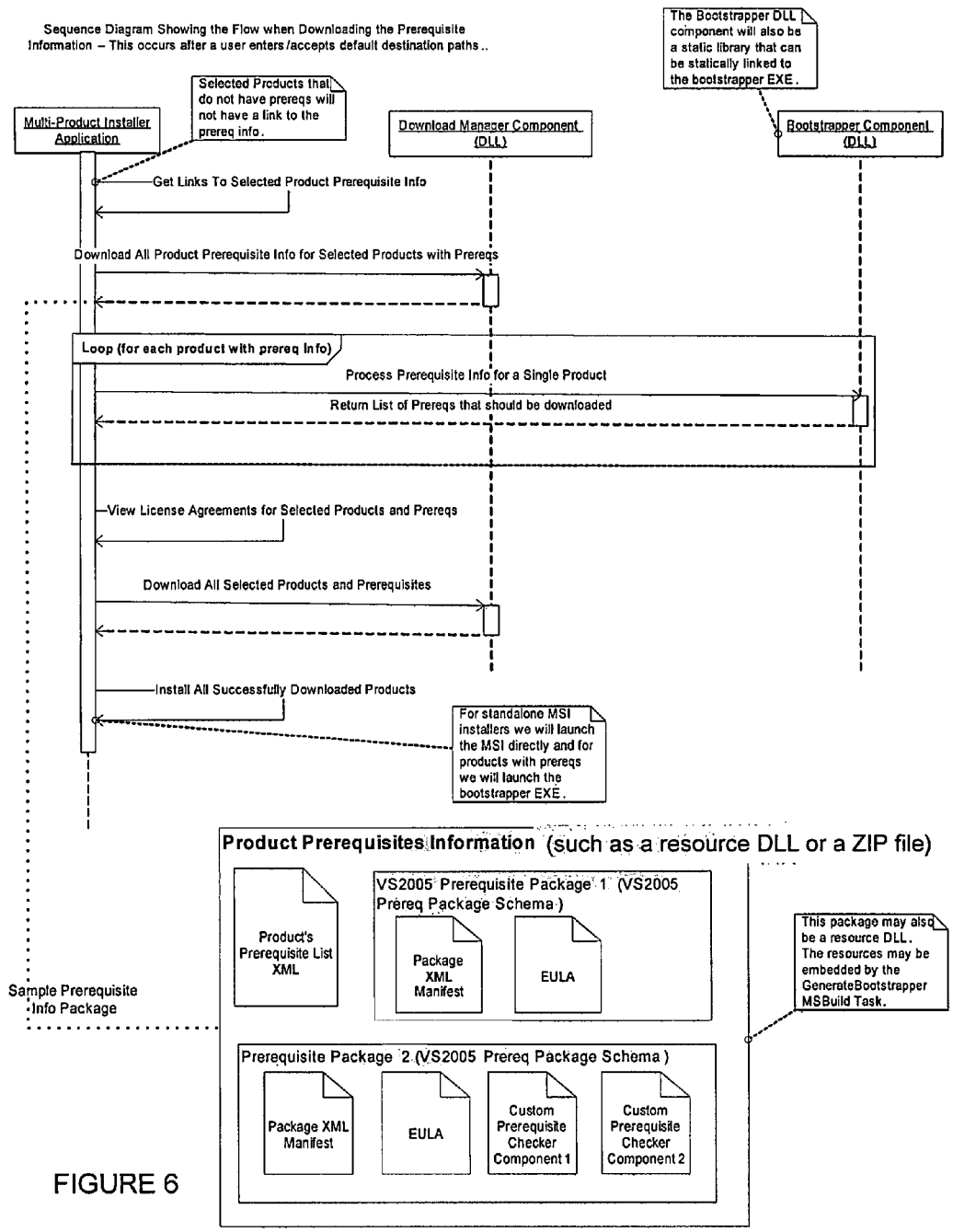
FIG. 6 is a sequence diagram showing the flow when downloading software products using the bootstrapper and download manager of the present invention.

FIG. 6 is a sequence diagram showing the flow of the bootstrapper and download manager when downloading prerequisite packages. Initially, the bootstrapper obtains links to selected products prerequisite information. The link information may be stored at a predefined location, for instance in "e-ToolsProductList.xml." The node is added to the XML when the e-ToolsProductList.xml is generated. The following Table 2 illustrates an example of how this might look in the XML.

TABLE 2

```
<?xml version="1.0" encoding="utf-8"?>
<DownloadableProducts Install="" Save="">
  <Product Product_ID="PBSE" Install="true" CD="" ProductLine="" Category="OBET" DisplayOrder="1">
    <Product_VersionString>
    <Product_VersionMajor>
    <Install_size>
    <ProductCode>
    <Product_GUID>
    <Product_FolderPath><![CDATA[\\qaweb\e-Tools Products\2007\01\PBSE]]></Product_FolderPath>
    <Product_Name><![CDATA[PPC e-Practice Aids Audits of Nonpublic
Companies (1-07)]]></Product_Name>
    <Product_License><![CDATA[TRUE]]></Product_License>
    <Product_Path><![CDATA[http://xxx.xxx.xx.xxx/e-ToolsProducts/2007/01/PBSE/setup.exe]]></Product_Path>
    <ProductMSI_Path><![CDATA[http://xxx.xxx.xx.xxx/e-ToolsProducts/2007/01/PBSE/PPC e-Practice Aids Audits of Nonpublic
Companies (1-07).msi]]></ProductMSI_Path>
    <ProductMSI_Path>
    <Product_Revision>
    <Product_Desc>
    <Product_TemplatePath>
    <Product_InstallCode>
    <Product_NetWorkPath>
  <Product Product_ID="SPRE" lnstall="true" CD="" ProductLine="" Category="ESPA" DisplayOrder="1">
    <Product_VersionString>
    <Product_VersionMajor>
    <Install_size>
    <ProductCode>
    <Product_GUID>
    <Product_FolderPath><![CDATA[\\qaweb\e-Tools
```

TABLE 2-continued

```
Products\2006\SPRE]]></Product_FolderPath>
    <Product_Name><![CDATA[PPC SMART e-Practice Aids - Risk
Assessment]]></Product_Name>
    <Product_License><![CDATA[TRUE]]></Product_License>
    <Product_Path><![CDATA[http://ppc.thomson.com.edgesuite.net/e-ToolsProducts/2006/SPRE/setup.exe]]></Product_Path>
    <ProductMSI_Path><![CDATA[http://ppc.thomson.-com.edgesuite.net/e-
ToolsProducts/2006/SPRE/PPC SMART e-Practice Aids - Risk
Assessment.msi]]></ProductMSI_Path>
    <ProductMSI_Path>
    <Product_Revision>
    <Product_Desc>
    <Product_TemplatePath>
    <Product_InstallCode>
    <Product_NetWorkPath>
    <Product_PrereqPackagePath>
      <![CDATA[http://ppc.thomson.com.edgesuite.net/e-ToolsProducts/2006/SPRE/PrereqPackage.zip]]>
    </Product_PrereqPackagePath>
  </Product>
</DownloadableProducts>
```

The node <Product_PrereqPackagePat> contains a link to the Prerequisite Package Information. Products that do not have prerequisites will not have this node or this node will be empty. Optionally a hash value may be included and used to verify the download of the "prereq" package. The bootstrapper downloads all Product Prerequisite Information for selected products with prerequisites. In the embodiment of FIG. 6, the Web Multi-Product (or Multi-Select) Installer Application (WMPIA) calls the download manager to download the prerequisite information package for each selected product with prerequisites. The prerequisite information package is a resource DLL but it may be a compressed (ZIP) file containing the XML prerequisite manifests for each prerequisite required by the product. The WMPIA passes the source—the prerequisite package path retrieved in step 1) and the destination path for each product to the download manager. The download manager downloads the prerequisite packages and returns a status for each downloaded prerequisite package. In one manner, a hash value is used to verify the file and is passed to the download manager. The download manager receives: Source Path, Destination Path, and Hash (optional—or public key as described above) for each prerequisite package and passes out the status for the download of each prerequisite package.

The package files may be unzipped in a number of different ways. Data is passed between WMPIA and the download manager using an array of structures. For example, an array of PRODUCT_DOWNLOAD or an array of FILE_DOWNLOAD if downloading a set of individual files that do not have a direct relationship to a product. See Table 3.

TABLE 3

```
Struct PRODUCT_DOWNLOAD
{
    TCHAR* displayName; //required
    TCHAR* productID; // default to new GUID if empty or null
    int downloadStatus;
    TCHAR* downloadStatusMsg;
    FILE_GROUP[ ] downloadGroups; // required
}
struct FILE_GROUP
{
    TCHAR* displayName; //required
    TCHAR* groupID; // default to new GUID if empty or null
    int downloadStatus;
    FILE_DOWNLOAD[ ] downloadFiles; // required
}
```

TABLE 3-continued

```
struct FILE_DOWNLOAD
{
    TCHAR* id; // optional; default to new GUID if empty or null
    int downloadStatus;
    TCHAR* downloadStatusMsg;
    TCHAR* sourcePath; // required
    TCHAR* destPath; // required
    TCHAR* hash; // optional
    TCHAR* publicKey; //optional
```

In the embodiment of FIG. 6, the bootstrapper processes prerequisite information for all products with prerequisites. For instance, the WMPIA calls the bootstrapper DLL to obtain a list of all the prerequisites to be downloaded and installed. The bootstrapper DLL checks the system requirements for each prerequisite and returns a status indicating whether the system meets the requirements for each of the prerequisites. The WMPIA passes the path to the folder containing the prerequisite manifests or the path to the compressed prerequisite package information file. The bootstrapper DLL returns a list of files to be downloaded, including the full path to the download location, status indicating whether the system meets the requirements for each prerequisite and a hash or public key to verify the prerequisite installation files once they are downloaded. The bootstrapper DLL receives the path to the folder containing prerequisite manifests or the path to the compressed prerequisite package info file. The bootstrapper DLL outputs the list of prerequisite files to be downloaded along with their path, the path to the EULA (End User License Agreement) (may be downloaded with the prerequisite package information), status indicating whether the system meets requirements for each prerequisite and an optional hash or public key.

In one example, data may be passed between WMPIA and the bootstrapper DLL using the array of structures set forth in Table 4.

TABLE 4

```
// The PREREQUISITE_FILE structure is created and set by the bootstrapper
component
    typedef struct PREREQUISITE_FILE
    {
    bool download; // required; true if file needs to be downloaded; otherwise
    false
    TCHAR sourcePath[MAX_PATH]; // required
    TCHAR destPath[MAX_PATH]; // required
    TCHAR hash[MAX_HASH_SIZE]; // optional
    TCHAR publicKey[MAX_PUBLIC_KEY_SIZE]; //optional
    long fileSize; // required
    } PREREQUISITE_FILE_STRUCT, *PREREQUISITE_FILE_STRUCT_PTR;
    // The PREREQUISITE structure is created and set by the bootstrapper
component
    typedef struct PREREQUISITE
    {
    TCHAR displayName[MAX_PREREQ_DISPLAY_NAME_SIZE];
    TCHAR prereqID[MAX_PREREQ_ID_SIZE]; and
    TCHAR licenseFilePath[MAX_PATH]; are required and are in the prerequsite
    manifest
    bool download; // required; true if prerequisite to be downloaded; otherwise
    false
    bool install; // required; true if prerequisite to be installed; otherwise false
    TCHAR sharedProductID[MAX_PRODUCT_ID_SIZE]; // the productID of a
    product that also installs this prerequisite
    PREREQUISITE_FILE *prerequisiteFiles;// required
    } PREREQUISITE_STRUCT, *PREREQUISITE_STRUCT_PTR;
    // The PRODUCT_PROCESSED structure is created and set by the
    bootstrapper component
    typedef struct PRODUCT_PROCESSED
    {
    TCHAR productID[MAX_PRODUCT_ID_SIZE]; // default to new GUID if
    empty or null
    TCHAR prereqManifestFilePath[MAX_PATH]; // required; path to resource
    DLL containing the prerequisite manifest
    TCHAR baseDownloadPath[MAX_PATH]; // required; download path with
    product identifiers
    bool failedRequirementsChecks; // required; true if requirements checks fail;
    otherwise false
    bool warningsIssued; // required; true if warnings are issued; otherwise false
    PREREQUISITE *prerequisites; // required
    } PRODUCT_PROCESSED_STRUCT,
    *PRODUCT_PROCESSED_STRUCT_PTR;
    // Declarations of the standard Win32 methods callable from the
    BootstrapperLibrary DLL
    extern "C" BOOTSTRAPPERLIBRARY_API HRESULT
    ProcessAllProductPrerequisites(PRODUCT_STRUCT_PTR products, int
    numProducts, PRODUCT_PROCESSED_STRUCT_PTR
    processedProducts Ptr);
```

In the embodiment of FIG. 6, the bootstrapper can allow a user to view license agreements for selected products and prerequisites. For instance, the WMPIA displays the license agreement screen. The license agreement screen displays a list of all products or product categories that have unique license agreements. Products with prerequisites will also list the prerequisites that have license agreements. The EULA for the prerequisites will be downloaded as part of the compressed prerequisite package information and paths to the EULA will be returned as part of the process described above. From this screen the user may selectively view each license agreement and accept all license agreements.

In the embodiment of FIG. 6, the multi-product installer calls the download manager to download all selected products and prerequisites. For instance, the WMPIA calls the download manager to download all of the selected products and their prerequisites. The WMPIA passes the source path, the destination path and the hash or public key for each product to the download manager. The download manager downloads the files and returns a status for each downloaded product. The download manager receives: Source Path; Destination Path; and Hash (optional) for each file in each product. The download manager returns the status for the download of each product. The bootstrapper may then pass data between WMPIA and the download manager using an array of structures to successfully downloaded products. The WMPIA then installs all of the selected products that were successfully downloaded and their prerequisites.

FIGS. 7 through 14 are screen shots exemplifying the user interface and user experience when presented with a software download and install system employing the bootstrapper and download manager of the present invention.

Figure 7:
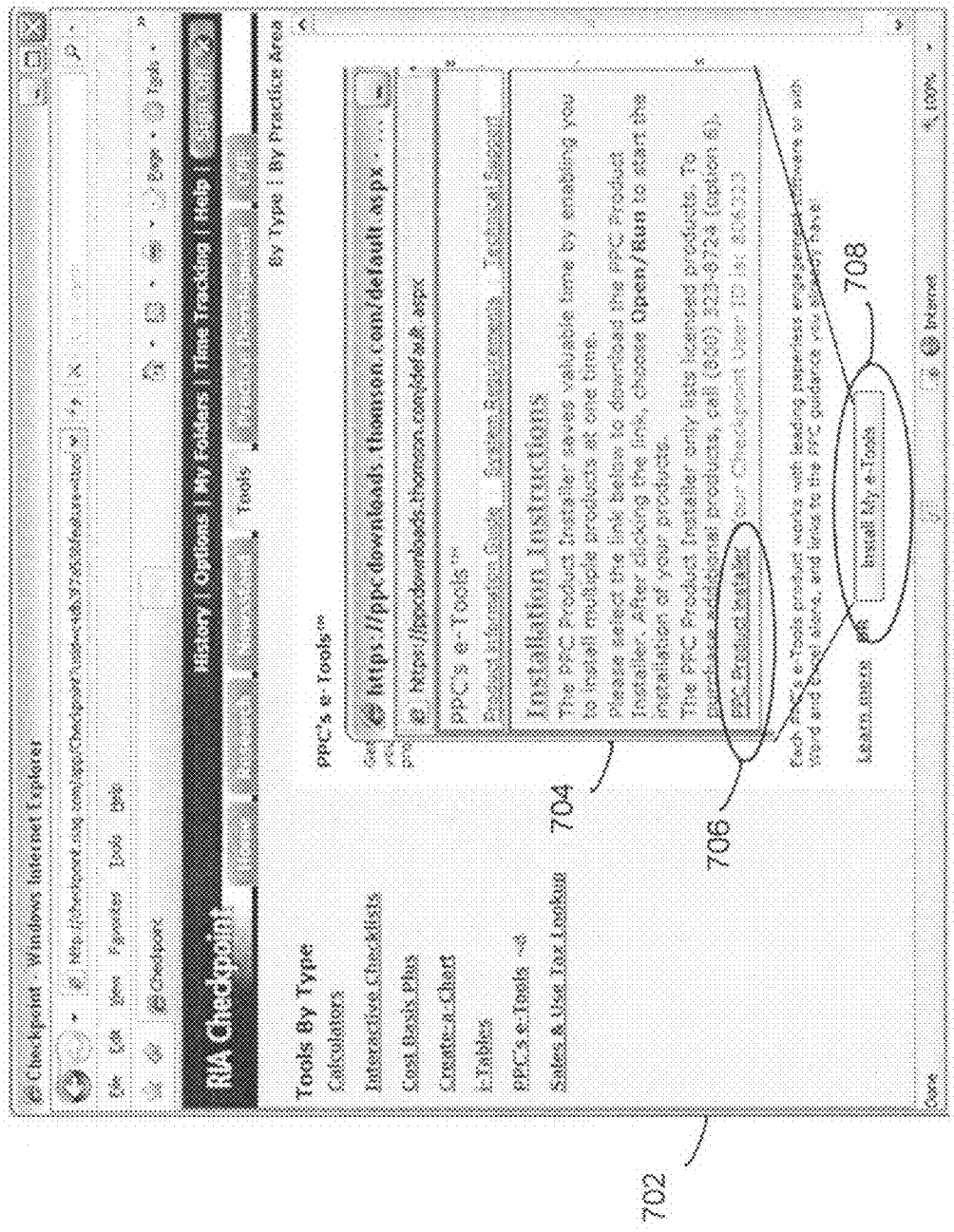
FIGS. 7 through 14 are screen shots representing functionality and user interface aspects of the bootstrapper and download manager of the present invention.

With reference to FIG. 7, a screen shot 702 illustrates an initial screen presenting a user with an option "PPC's e-Tools" under "Tools By Type." When presented with the PPC e-Tools page, the user may select the "Install My e-Tools" button 708. Upon selecting button 708, the user is presented with the Installation Instructions page 704, which includes a PPC Product Installer link 706.

Figure 8:
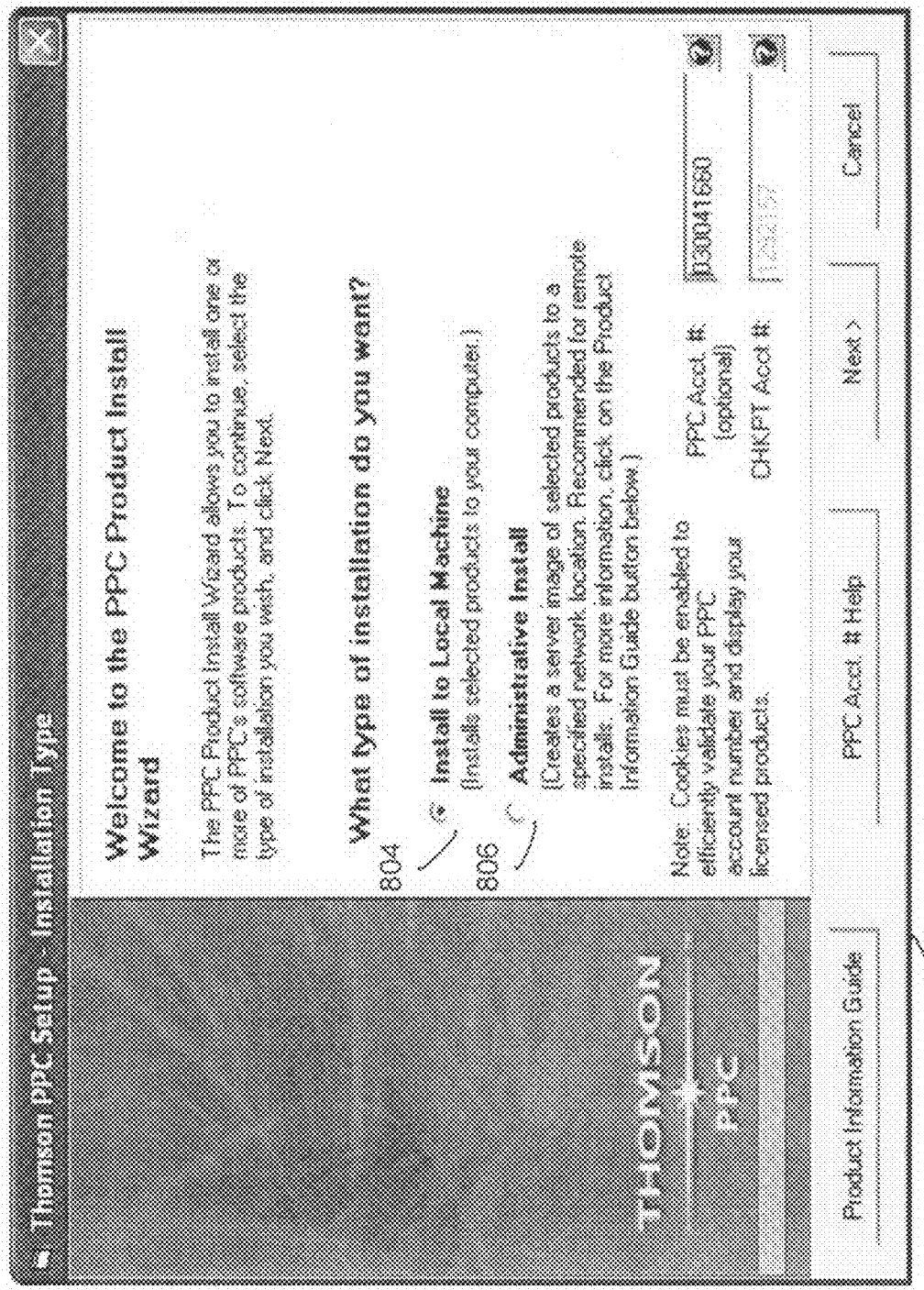
Figure 9:
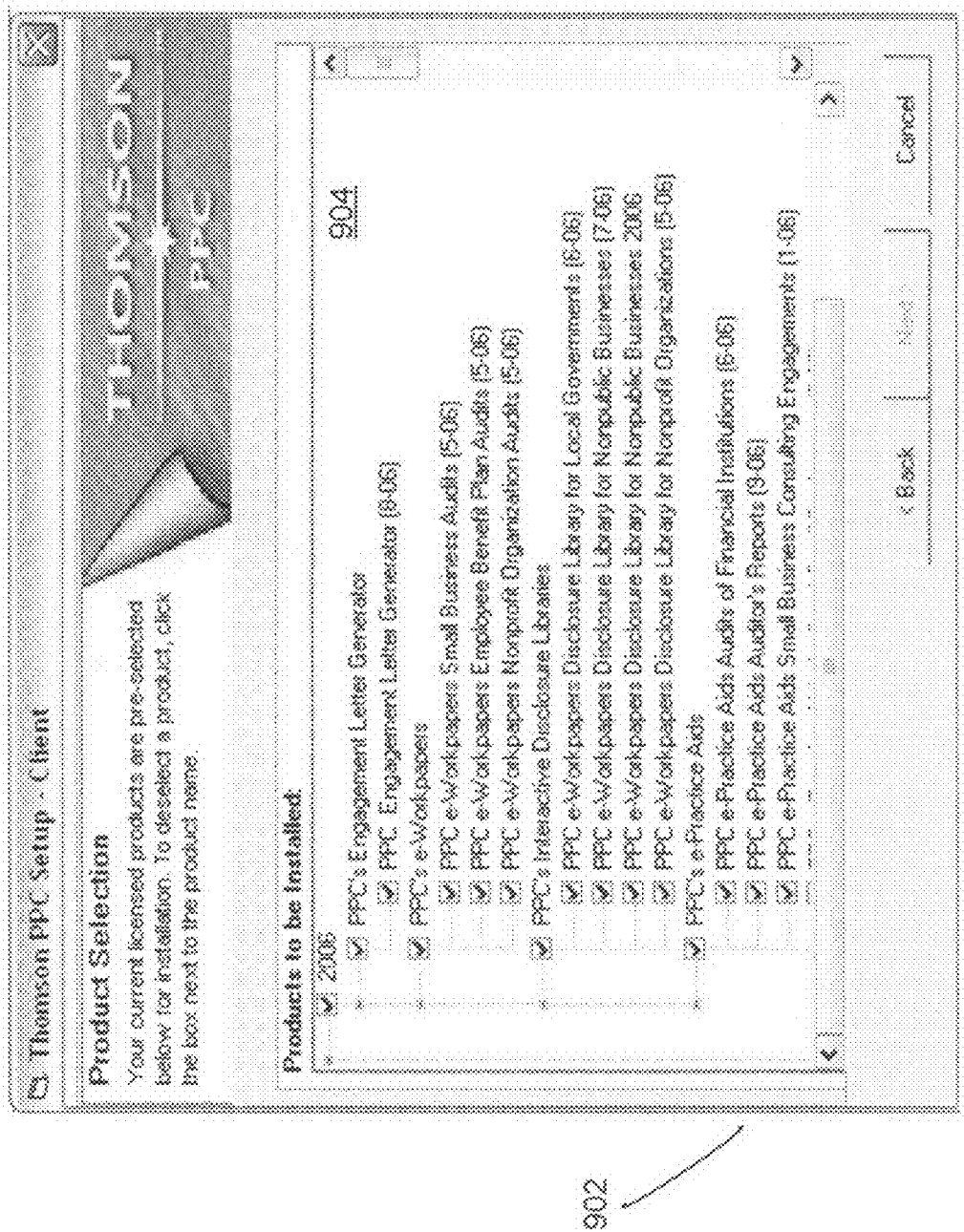

FIG. 8 is a screen shot 802 representative of a screen presented to a user after selecting the install button 708. Screen 802 presents a "PPC Product Install Wizard" to the user including two selections 804 (Install to local machine) and 806 (Administrative install) in response to "What type of installation do you want?" prompt. After selecting one of the two choices, FIG. 9 presents a screen shot 902 of a "Product Selection" page including "Product to be installed:" selection area 904, which presents to the user the multiple software products available for download to the user, e.g., local machine 102. As shown in the screen shot 902, all of the options are selected, as noted by the check marks in the boxes. However, the user has the option of deselecting or selecting the particular products to be downloaded—or purchased for download or requested for download. This or other screens may present the user with the opportunity to direct the download to a particular file/folder-location and/or the system may suggest such a location. However, as described above, the bootstrapper and download manager may control the file/folder location and format to accomplish the intended goals set forth herein. Once installed, the files may be located as directed by the user or the system may use this location.

Figure 10:
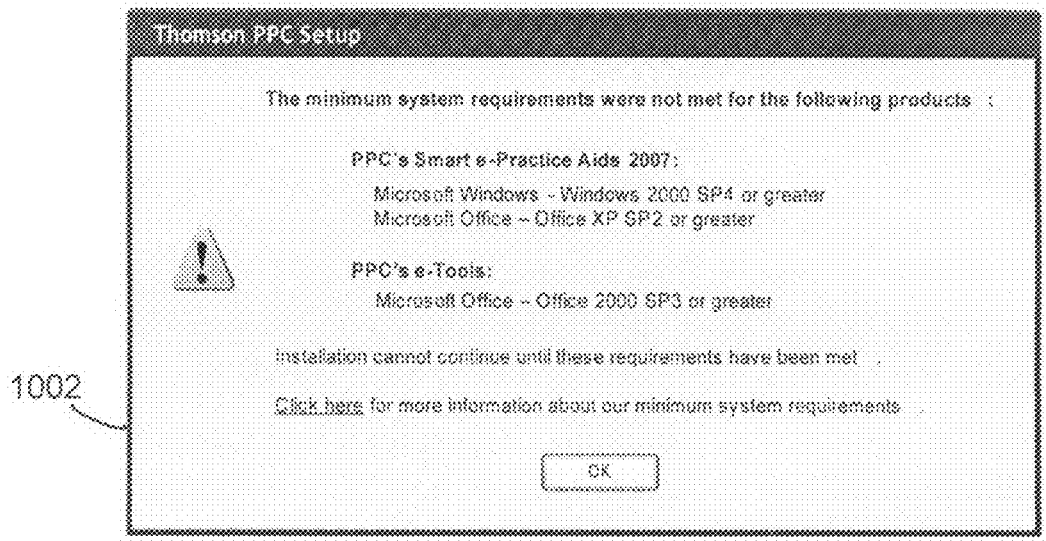

FIG. 10 is an exemplary window 1002 showing that minimum system requirements were not met for certain identified products and gives additional information, guidance and options for continuing. This may be presented following the bootstrapper application analyzing the target machine for system requirements and prerequisites, such as described as step 2) of FIG. 2 and step 2 of FIG. 3.

Figure 11:
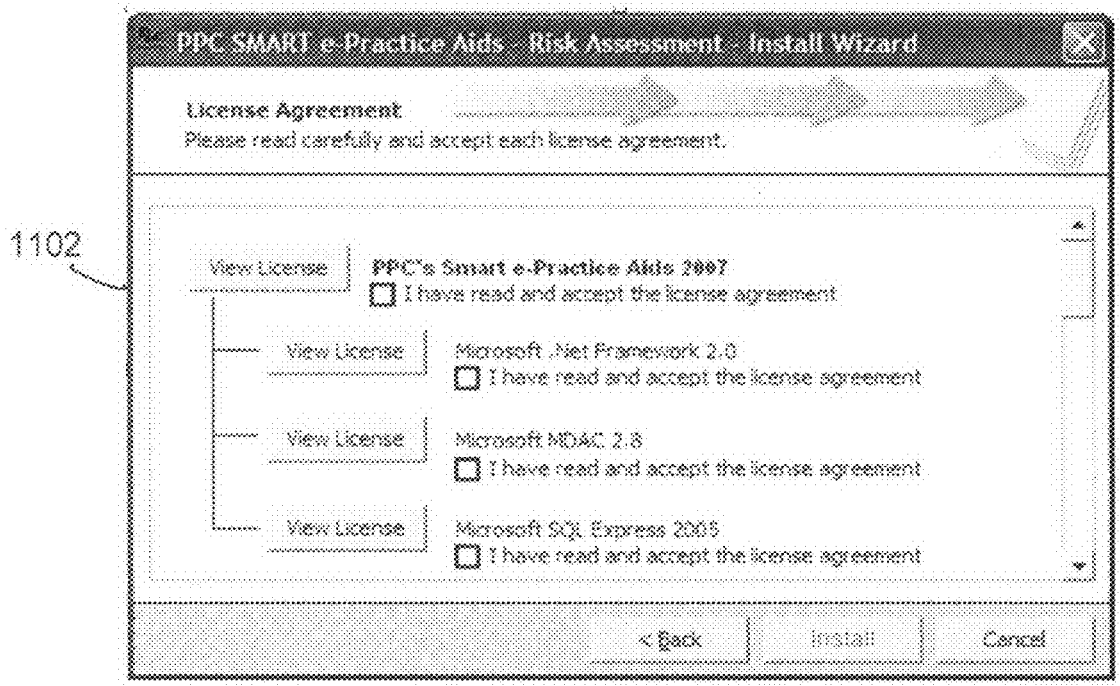

FIG. 11 is a screen shot 1102 that represents a "License Agreement" page or window that may be presented to a user during the download process. License agreement, acknowledgment and other information or windows may be presented and processed to facilitate download and installation of software products.

Figure 12:
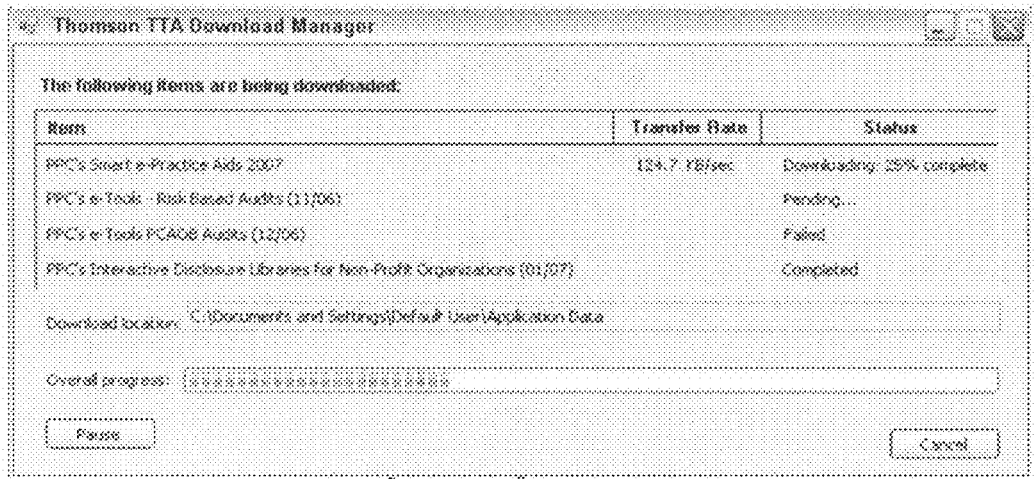
Figure 13:
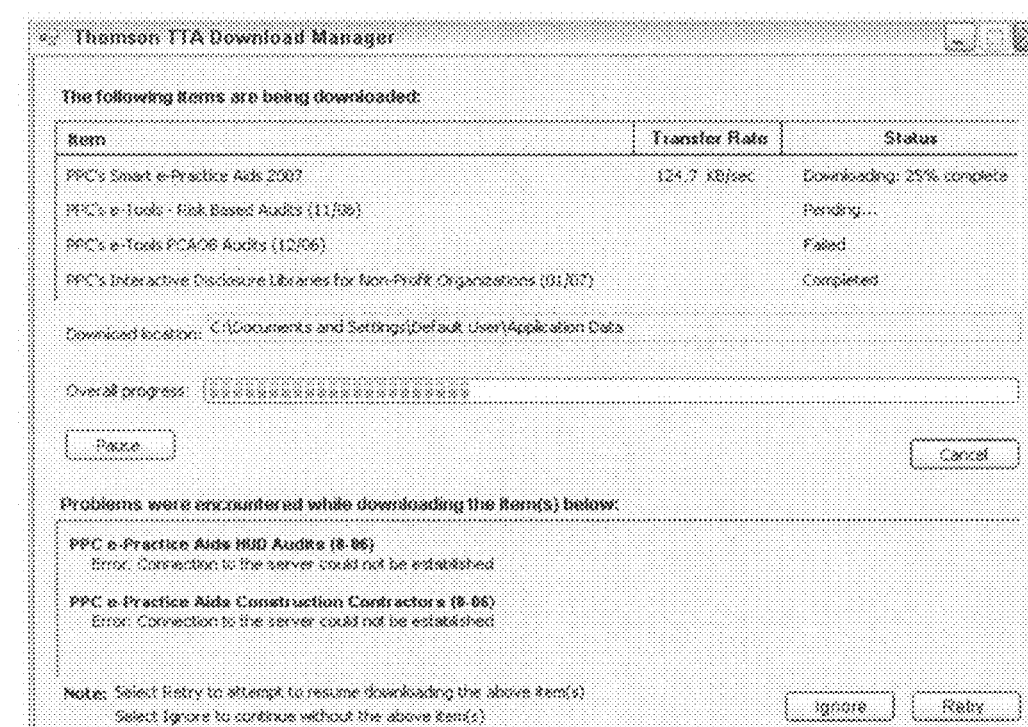

FIG. 12 is a screen shot of a window 1202 presented to a user by the download manager to show the progress and/or status of software products being downloaded onto the local machine 102, for instance. FIG. 13 shows a variation of the screen shot of FIG. 12 further including a notice of problems that occurred during download or installation.

Figure 14:
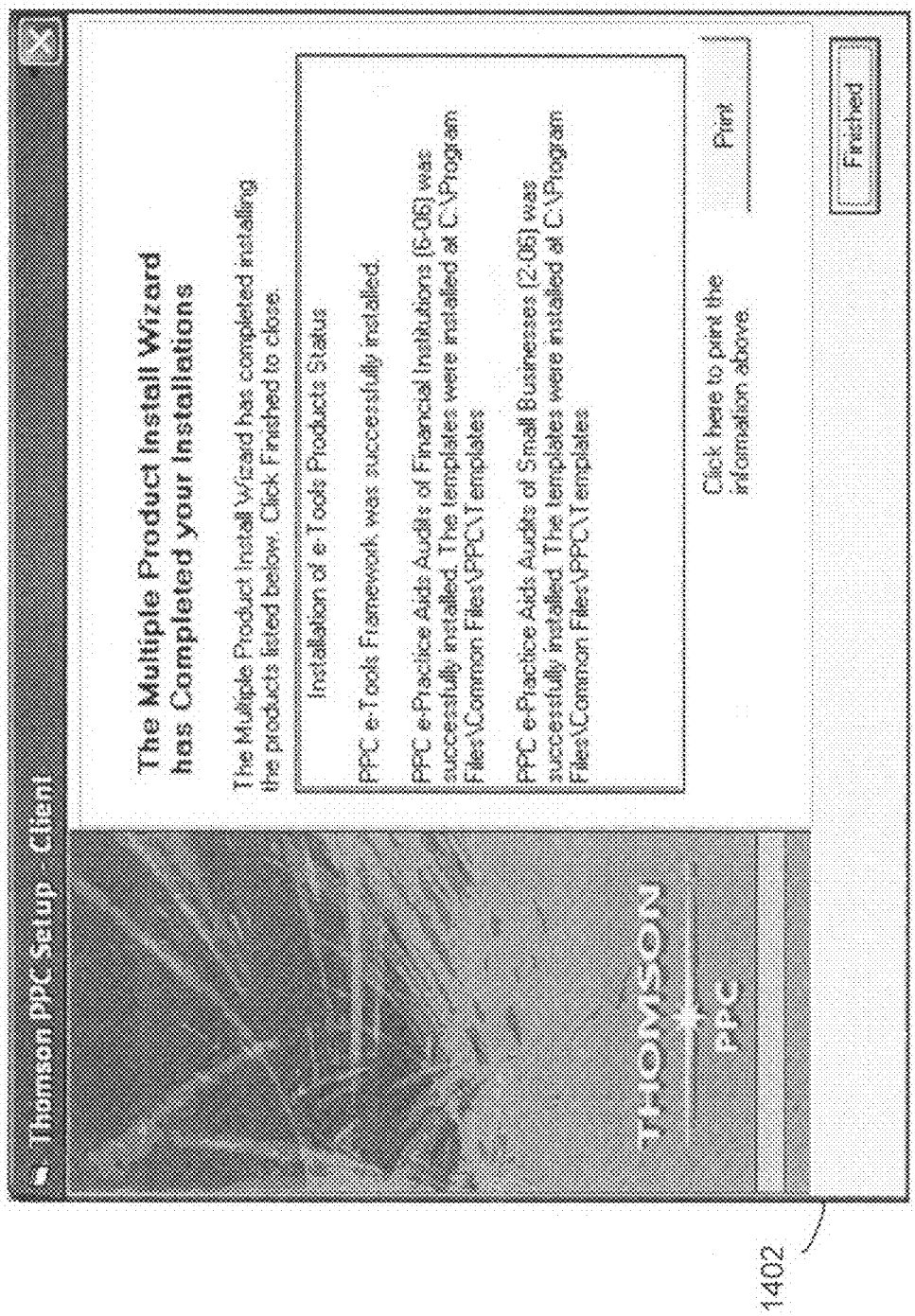

FIG. 14 is a screen shot 1402 presenting to the user that the download and installation has been completed and identifying the multiple software products successfully downloaded and installed on the target machine.

The present invention is not to be limited in scope by the specific embodiments described herein, It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A method of installing software by a user on a destination computing device, the method comprising:
   presenting, at a display associated with the destination computing device, for selection a plurality of software products for downloading and installing on the destination computing device, wherein the software comprises selections from the plurality of software products;
   receiving a signal representing a selection of at least one software product from the plurality of software products;
   prior to commencing installation, downloading the software;
   commencing installing software on a destination computing device, including performing any necessary software download from a single source into a memory associated with the destination computing device;
   determining that not all of the software was successfully downloaded;
   prior to recommencing installation, re-downloading software that was not successfully downloaded while avoiding re-downloading at least some of the software that was successfully downloaded;
   upon an interruption in the installing step, determining whether the software is stored in the memory of the destination computing device; and
   if the software is stored in the memory of the destination computing device, recommencing installing the software without causing a further download of the software.

2. The method of claim 1 further comprising:
   determining a first set of prerequisite software associated with a first software product and a second set of prerequisite software associated with a second software product; and determining a set of shared prerequisite software comprising prerequisite software common to the first and second sets of prerequisite software.

3. The method of claim 2 further comprising:
downloading the shared prerequisite software, whereby duplicate downloading of shared prerequisite software is avoided.

4. A computer implemented method for downloading software for storing and installing on an end user destination computing device, the method comprising:
transmitting for presenting at an end user display device a plurality of software products available for download to the end user destination computing device;
receiving a signal representing a selection of at least one software product from the plurality of software products;
downloading for storing and installing on the end user destination computing device at least two software products selected from the plurality of software products, the at least two software products including:
a first software product associated with a first at least one prerequisite software product, and
a second software product associated with a second at least one prerequisite software product;
determining a set of prerequisite software products associated with the at least two software products for downloading including excluding from the set of prerequisite software products any duplicate prerequisite software products from the first and second at least one prerequisite software products;
determining based on evaluation of the end user destination computing device whether one or more of the set of prerequisite software products is stored on the end user destination computing device and downloading any un-stored prerequisite software products from the set of prerequisite software products;
wherein the at least two software products along with any un-stored prerequisite software products comprise a download software package;
after an interruption in installing the download software package, determining that a portion of the download software package is stored in memory and recommencing the installation step without causing a further download of the stored portion of the download software package; and
downloading a missing portion of the download software package, whereby the stored portion and the missing portion combine to provide a complete download of the download software package sufficient for installation.

5. The method of claim 4 wherein the set of prerequisite software products comprises at least one prerequisite software product.

6. A client device connected to a software source, the client device comprising:
a processor for executing software;
a memory connected to the processor and adapted to receive and store software from a single software source for execution by the processor, wherein the memory comprises a temporary memory for receiving software downloads, and a persistent memory for storing installed software; and
a bootstrapper adapted to manage the download and installation of software from the single software source, the bootstrapper comprising:
a user interface enabling by a user operating the client device_selection of software to be received by and installed on the client device; and
executable code adapted to determine whether selected software is stored in the memory, whereby upon interruption of an installation unnecessary downloading of software during installation is avoided, and wherein the bootstrapper executable code is further adapted to determine that a portion of selected software is stored in the temporary memory and the bootstrapper causes a downloading of unstored portions of the selected software to complete the download for installation of the selected software.

7. The client device of claim 6 wherein the single software source is a central server and the client device receives software from the central server via a communication network.

8. The client device of claim 6 wherein the single software source comprises one of a CD ROM, a USB flash drive, and a memory stick.

9. The client device of claim 6 wherein the client device comprises one of a computer, a PDA, a mobile phone.

10. The client device of claim 6 further adapted to configure folders at a specified location at which the software is installed on the client device.

11. The client device of claim 10 wherein the software is stored in a persistent memory of the client device.

12. A method for downloading and installing software on a destination computing device, the method comprising:
determining whether at least one prerequisite software associated with a software product to be downloaded is installed on a destination computing device;
prior to commencing installation, requesting download of the software product comprising at least one uninstalled prerequisite software;
upon an interruption in the installation of the software product:
if the prerequisite software is not installed on the destination computing device, then determining whether the prerequisite software is stored on the destination computing device;
if the prerequisite software is not stored on the destination computing device, then downloading and installing the prerequisite software on the destination computing device; and
if the prerequisite software is stored on the destination computing device, then installing the stored prerequisite software;
determining that not all of the software was successfully downloaded; prior to recommencing installation, re-downloading software that was not successfully downloaded while avoiding re-downloading at least some of the software that was successfully downloaded.

13. The method of claim 12 further comprising selecting a set of at least one software product for downloading to the destination computing device.

14. The method of claim 13 wherein selecting the software set comprises selecting multiple software products for downloading including a first software product having a first at least one prerequisite software and a second software product having a second at least one prerequisite software, wherein the first and second software products have at least one shared prerequisite software, and further comprising avoiding multiple downloads of the shared prerequisite software.

15. The method of claim 12 further comprising determining software products already installed on the destination computing device and presenting to the user a prompt to select a set of at least one software product to be downloaded.

16. The method of claim 15 wherein the user deselects predefined software download prompts and manually selects desired software products to be downloaded.

17. The method of claim 12 further comprising determining whether a selected software product is licensed.

18. The method of claim 12 further comprising presenting license agreements associated with selected software products as a predicate to download.

19. The method of claim 12 further comprising interrogating the destination computing device to see if the most current version of a prerequisite or a selected software product is present on the destination computing device.

20. The method of claim 12 further comprising determining whether a selected software product is installed on the destination computing device.

21. The method of claim 12 further comprising providing an administrative install whereby folders are configured or specified for defining folders at a specified network location at which the install is stored.

22. A bootstrapper for managing the download of software products into a memory associated with a destination computing device, the bootstrapper comprising:
   a processor and a memory;
   a user interface operating on the destination computing device and enabling selection of the software product to be installed from a single software source on a destination computing device associated with the bootstrapper;
   executable code stored in the memory and when executed by the destination computing device adapted to determine upon interruption of an installation whether the software product is stored in a memory of the destination computing device but is not installed on the destination computing device;
   wherein the executable code determines that a portion of the selected software necessary for installation is not present in the memory of the destination computing device and causes a downloading of unstored portions of the selected software; and
   wherein downloading of the selected software product has completed and the executable code is further adapted to install the downloaded software product onto the destination computing device.

23. The bootstrapper of claim 22 wherein the executable code determines that a portion of the selected software necessary for installation is not present in the memory of the destination computing device and causes a downloading of unstored portions of the selected software.

24. The bootstrapper of claim 23 wherein downloading of the selected software product has completed and the executable code is further adapted to install the downloaded software product onto the destination computing device.

25. The bootstrapper of claim 22 further adapted to configure folders at a specified location at which the software product is installed on the destination computing device.

26. The bootstrapper of claim 25 wherein the software product is stored in a persistent memory of the destination computing device.

27. The method of claim 12 further comprising, presenting, at a display associated with the destination computing device, for selection a plurality of software products for downloading and installing on the destination computing device, wherein the software comprises selections from the plurality of software products; and
   receiving a signal representing a selection of at least one software product to be downloaded from the plurality of software products.

* * * * *